United States Patent [19]

Blood, Jr.

[11] E Re. 30,111

[45] Reissued Oct. 9, 1979

[54] DIGITAL SINGLE SIGNAL LINE FULL DUPLEX METHOD AND APPARATUS

[75] Inventor: William R. Blood, Jr., Phoenix, Ariz.

[73] Assignee: Motorola, Inc., Schaumburg, Ill.

[21] Appl. No.: 929,761

[22] Filed: Jul. 28, 1978

Related U.S. Patent Documents

Reissue of:

[64] Patent No.: 3,993,867
Issued: Nov. 23, 1976
Appl. No.: 514,526
Filed: Oct. 15, 1974

[51] Int. Cl.[2] ..... H04L 5/14

[52] U.S. Cl. ..... 178/58 R; 179/1 CN; 179/1 H

[58] Field of Search ..... 178/58 R, 68; 179/1 CN, 179/1 H; 325/38 A, 21, 22

[56] References Cited

U.S. PATENT DOCUMENTS

| | | | |
|---|---|---|---|
| 3,369,229 | 2/1968 | Dorros | 179/15 BM |
| 3,519,743 | 7/1970 | Herter | 178/58 R |
| 3,531,594 | 9/1970 | Dickerson | 179/1 H |
| 3,573,370 | 3/1969 | Blauert | 178/58 R |
| 3,824,344 | 7/1974 | James et al. | 179/1 CN |

FOREIGN PATENT DOCUMENTS

| | | |
|---|---|---|
| 1931162 | 1/1970 | Fed. Rep. of Germany . |
| 502726 | 3/1971 | Switzerland . |
| 1300649 | 12/1972 | United Kingdom . |
| 1359700 | 6/1974 | United Kingdom . |

OTHER PUBLICATIONS

Isberg, Ranson, "D.C. Duplexor," IBM T.D.B. Jun. 1962.

*Primary Examiner*—Kathleen H. Claffy
*Assistant Examiner*—E. S. Kemeny
*Attorney, Agent, or Firm*—Marvin A. Glazer; Kenneth R. Stevens

[57] ABSTRACT

A driver circuit that permits full duplex transmission of digital data on a single signal line includes means for enabling a receiver of a station having a transmitter and a receiver to ignore outgoing digital signals from the transmitter of the same station and receive incoming signals. The circuit includes means that combine the incoming and outgoing digital signals in the signal line to form a composite multi-level signal which shifts between predetermined amplitude levels and means that recover the incoming digital signals from the composite signal. An offset bias level is added within the receiver signal processing to the transmitter pulse level to reduce noise susceptibility. Using such a circuit a full duplex transmission system of a plurality of stations connected to a common single signal line is provided. Such a system can be operated in a broadcast mode wherein one station can transmit signals to the remainder of stations.

12 Claims, 5 Drawing Figures

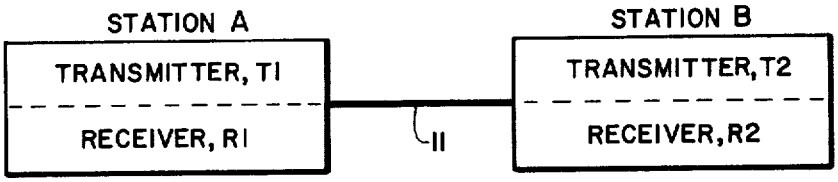
FIG. 1
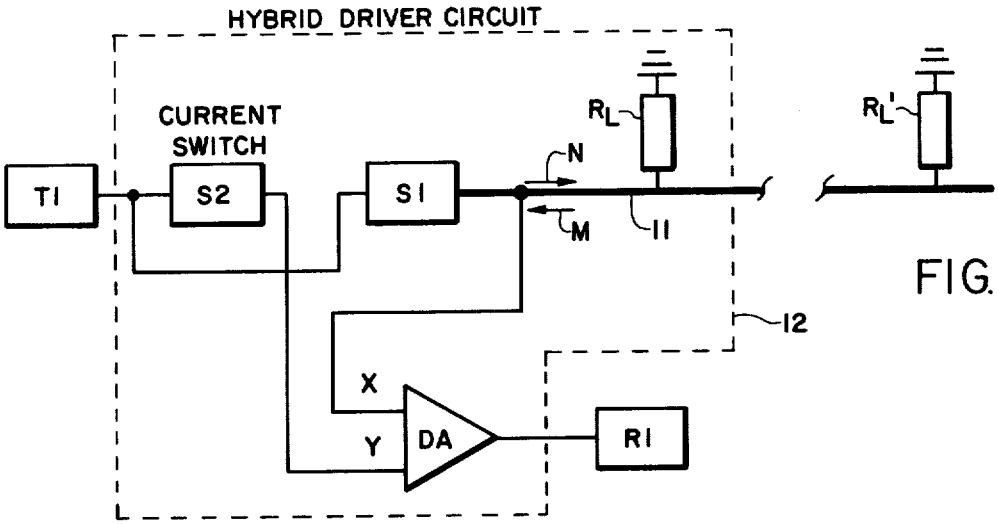
FIG. 2
FIG. 5
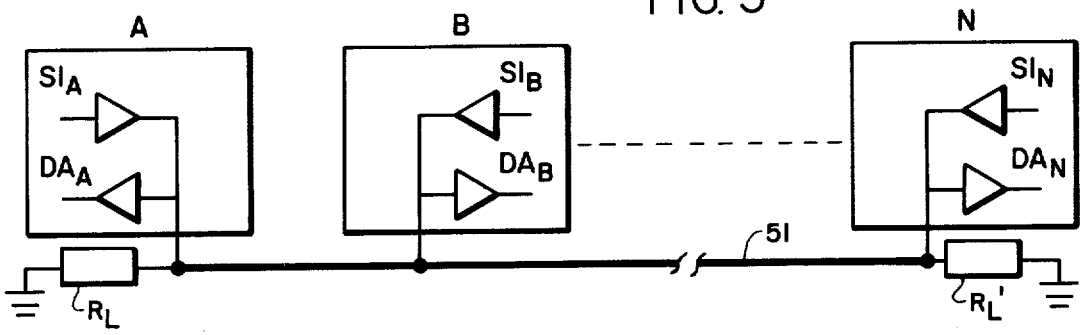
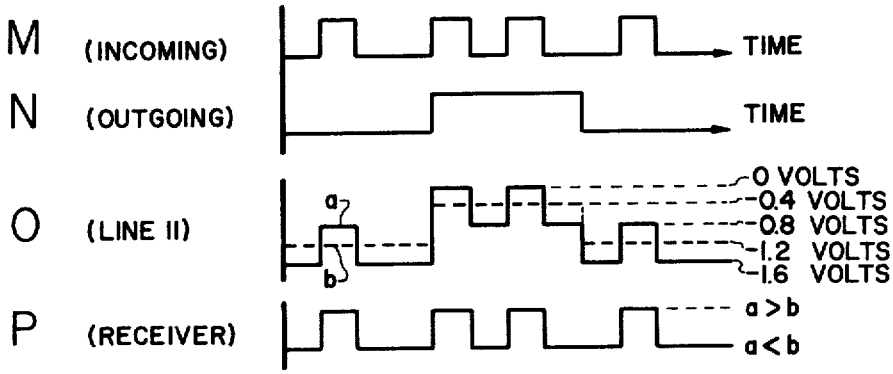
FIG. 3

12
Vcc
VEE
r7
r8
r9
Q6
r5
13
S1
Q5
Q4
Q7
r6
11
X
Y
DA
RECEIVER
R1
R'L
RL
r10
S2
Q3
Q2
r4
r3
r2
Q1
r1
TRANSMITTER
T1

DIGITAL SINGLE SIGNAL LINE FULL DUPLEX METHOD AND APPARATUS

Matter enclosed in heavy brackets [ ] appears in the original patent but forms no part of this reissue specification; matter printed in italics indicates the additions made by reissue.

FIELD OF THE INVENTION

This invention relates to a driver circuit for duplexing apparatus and methods in general and, in particular, apparatus and methods that permit full duplex transmission of digital data on a single line.

BACKGROUND OF THE INVENTION

In handling analog signals, duplexing methods and apparatus have been used rather extensively to minimize the number of transmission lines and increase transmission capacity. Thus, for example, in telephone art, methods entailing use of bridge circuits operated by voice signals have been in use extensively to provide full duplex operation. Also, modulation approaches of various nature have been utilized in radio or high frequency transmission art to provide a full duplex operation. It has been found that these approaches are slow and rather complex. For example, the modulation approach tends to be speed limited because the carrier has to be faster than the signal and requires rather complex modulation, demodulation and detection circuitry.

Serious attempts have been made to utilize the aforementioned duplexing methods or apparatus or develop new methods or apparatus in handling digital signals. However, to date, as far as the present inventor is aware, such attempts have been successful only to the extent of providing full duplex operation using frequency shift modulation or similar techniques that require sending carrier signals at higher frequencies than the data rate. This requires complicated encoding and decoding circuitry and restricts the data transmission rates to well below the speeds of modern digital circuits. Present techniques for sending high speed digital data in a signal line are restricted to half duplex operation.

SUMMARY OF THE INVENTION

The foregoing and other shortcomings and problems of the prior art are overcome, in accordance with the present invention, by utilizing inventive driver circuit means that permit the receiver of a station having a transmitter and a receiver to receive an incoming digital signal from the transmitter of another station but prevent the receiver from receiving digital signals being sent out by the transmitter of the same station.

According to an aspect of the present invention, a novel method is provided to permit a full duplex transmission of digital signals over a single signal line without requiring carrier signals.

According to another aspect of the present invention, novel driver circuit means that permit a full duplex, synchronous or asynchronous, digital signal transmission over a single signal line is provided.

The basic invention uses a summing resistor as a load resistor across the transmission line at each terminal. The voltage drop across this resistor is the composite (sum) of the local and remote transmitters. A difference amplifier subtracts the composite (sum) line voltage from the local transmitter voltage (modified with an offset bias) to derive the net received line voltage. The offset bias reduces noise susceptibility.

The foregoing and other aspects of the present invention will be understood more fully from the following detailed description of an illustrative embodiment of the present invention in conjunction with accompanying drawings, in which:

FIG. 1 shows a block diagram of a transmission system in which the present invention may be utilized;

FIG. 2 shows an illustrative driver circuit of the present invention in a block diagram form;

FIG. 3 shows signal waveforms found at certain points in the present circuitry that demonstrate its synchronous and asynchronous full duplex operation.

FIG. 5 shows a transmission system in a block diagram form utilizing the present full duplex transmission methods and apparatus involving a plurality of stations, each having a transmitter and a receiver.

DETAILED DESRIPTION

Figure 4:
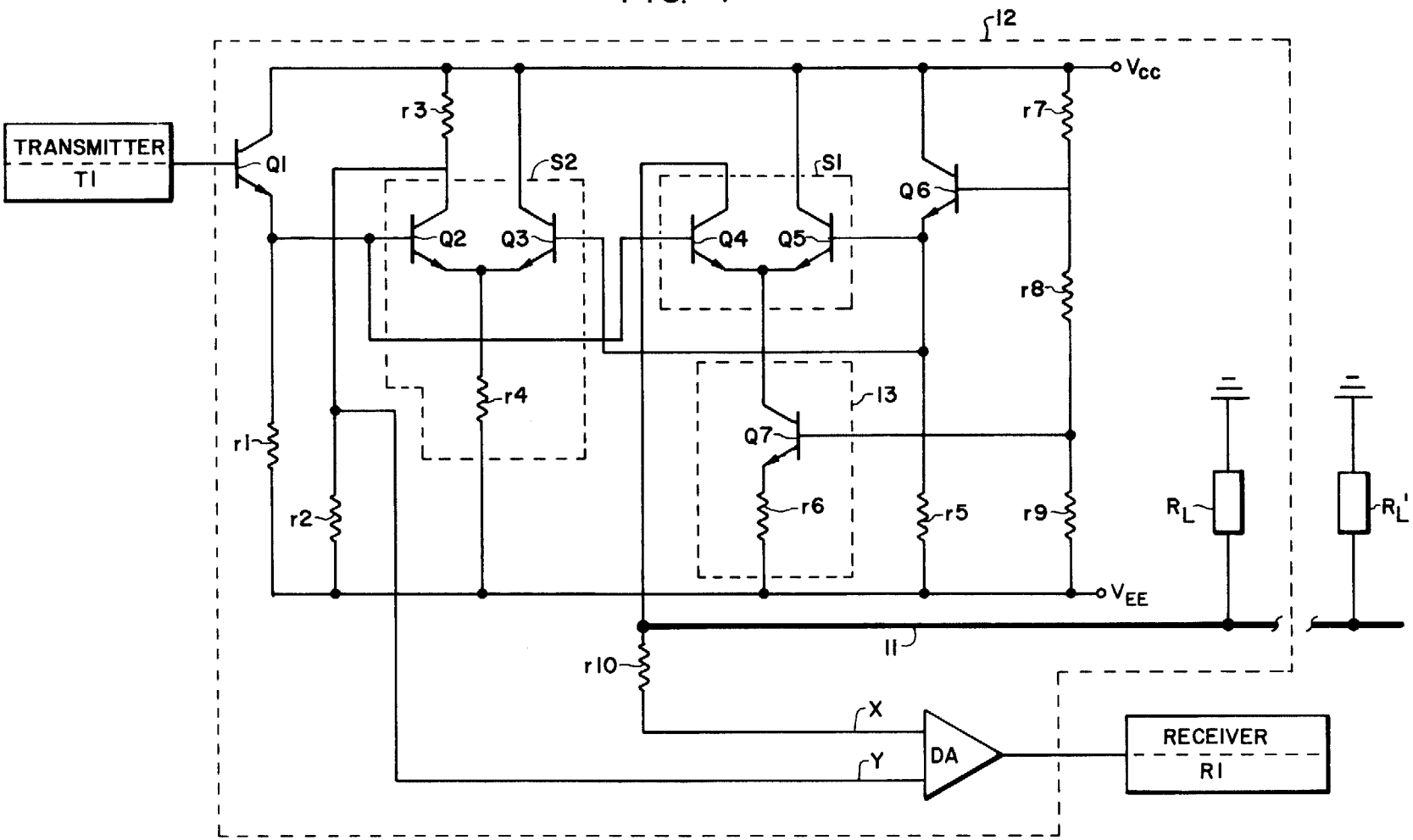
FIG. 4 shows a detailed illustrative circuit of the type shown in FIG. 2.

FIG. 1 shows in a block diagram form a full duplex digital transmission system that comprises a single transmission line or bus 11 connecting a first station A to a second station B wherein each station includes a transmitter/receiver pair. It is to be understood that "transmitter" and "receiver" mentioned in this specification, are used as generic expressions to denote many diverse systems and subsystem components, such as teletypewriters, CRT display devices, memories, registers, central processing units and the like that function as a transmitter or receiver of digital signals. Likewise, a "transmission line" is used as a generic expression to denote a single signal transmission path, such as a bus interconnecting the stations. Also, the "full duplex digital transmission" systems described herein is intended to encompass synchronous as well as asynchronous transmission systems. Hence, in this context, whether synchronous or asynchronous, at any given moment there may exist simultaneously outgoing digital signals from station A to station B and incoming digital signals from station A to station B and the system can handle the incoming and outgoing digital signals simultaneously.

In accordance with the present invention, full duplex operation of the transmission system over a single signal line is rendered possible by using a driver circuitry of a unique design that applies the outgoing signal from a transmitter to the signal line, that applies incoming digital signals from the line to the receiver, and that prevents the receiver from receiving outgoing digital signals from the transmitter of the same station. FIG. 2 illustrates an operational block diagram of the circuit means that implement the aforementioned full duplex transmission method.

Generally stated, the driver circuit means comprises first and second switching means S1 and S2 and a differential amplifier means DA operatively connected to permit the full duplex operation. The first switching means S1 is of a suitable design that applies the outgoing signal from the transmitter T1 to the single signal line or bus 11. The signals in the line 11 are applied at one, x, of two inputs to the differential amplifier. Second switch S2 is used to derive an indicating signal representing the outgoing digital signal from the transmitter T1. This indicating signal is applied, at the other y, of the two inputs, to the differential amplifier. The first switch S1 and load impedance RL are used in a very unique manner to generate and apply three level DC voltage conditions at the input of the differential amplifier DA.

The differential amplifier then compares its two inputs x and y and determines from the comparison whether the signals present in line 11 are outgoing or incoming digital signals or both, and prevents the receiver from receiving the outgoing digital signals, but permits it to receive incoming digital signals from the transmitter T2 of another station B.

The aforementioned capability of the driver circuit can then be readily used to render a digital transmission system having a plurality of stations, each station having a transmitter and a receiver operative in a full duplex mode over a single signal line. This means that outgoing and incoming digital signals may exist simultaneously in the signal line and that the system can transmit and receive them simultaneously.

Referring to the drawings, FIGS. 2 and 3 show digital signals of conventional format comprised of binary 1s and 0s found in line 11 transmitted by the transmitters T1 and T2 of communicating pair of stations. Illustrative outgoing digital signals N from the transmitter T1 and incoming digital signals M from the transmitter T2, found in transmission line 11, are shown in FIG. 3. These signals appear in the form of voltage signals and this is rendered possible by using a current switch for switch S1. Current switch S1 may be of any conventional design that converts its input, that is, the outgoing digital signals from transmitter T1, which may appear in the voltage form into current signals. The current signals are then applied to load impedances RL and RL' to provide IR voltage drop. It is to be understood that load impedances RL and RL' are intended to represent any suitable combination of elements that match line impedances and the provides desired voltage drop thereacross.

The IR drop forms voltage waveforms in digital signals such as those shown in FIG. 3. Note that the net composite of the outgoing and incoming signals appearing in the signal line is a scalar or an analog addition of the two signals. This unique feature rendered possible by the use of current switch S1 and is demonstrated graphically in FIG. 3; O, shown in a solid line and designed waveform a. Note that waveform a in FIG. 3; O is a composite or algebraic addition of the outgoing and incoming waveforms M and N shown in FIG. 3. This composite waveform appears in line 11 and is also applied to one of the inputs, x, of the differential amplifier.

Now another aspect of the present circuit is that it includes a suitable circuit means, such as a switch means S2 that derives an indication signal which appears in a voltage digital form that follows the pattern of the outgoing digital signal. In other words, switch S2 is of a design that provides output digital signals from the input thereof that are the same as the input in signal format. Hence, it provides a copy of the input. This is graphically demonstrated by the dotted line b in FIG. 3; O.

To reduce the noise susceptibility of the system the digital signal (shown as waveform b in FIG. 3; O) appearing at input y of differential amplifier DA has two voltage levels which fall exactly half way between the first and second, and second and third voltage levels appearing on the line 11. Any noise induced spurious signal must be of a magnitude greater than 0.4 volts to cause an error to be transmitted to the receiver R1 by the voltage comparator DA. If the fourth and fifth levels were not maintained exactly half way between the first, second, and third levels, a much lower amplitude noise signal would be able to trigger a spurious output from the voltage comparator DA which would then be detected by the receiver R1. For instance, if waveform b shown in FIG. 3; O [where] *were* offset only 0.1 volts above the outgoing transmitted signal, a noise induced signal having an amplitude exceeding 0.1 volts would be sufficient to trigger the comparator DA which would then generate a spurious output signal.

Now the differential amplifier is used to serve its conventional function of comparing the two signals a and b at its two inputs x and y and generate an output, shown in FIG. 3; P. Note that the resulting output is a digital signal which is the same as the incoming digital signal. An inherent built-in function of the differential amplifier compares the composite signal (FIG. 3; O) in the line 11 with the indication digital signal and derives its output (FIG. 3; P), which is the same as the incoming digital signal in the digital form. The resulting output (FIG. 3; P) may then be applied to the receiver R1 in a conventional manner.

Note that an interesting phenomenon is observed. What the differential amplifier does, in effect, is that is subtracts in amplitude sense the input or outgoing digital signals (FIG. 3; M) from the composite signal (FIG. 3; O) in line 11, and the resulting difference (FIG. 3; P) is applied as its output. This is graphically illustrated in FIG. 3; P. Note that the dotted line b or the indication signal applied to the second input is the same in signal format as the outgoing signal and amplitude shifts the composite wave a so that the shift results in the formation of the output wave (FIG. 3; P), which is a reproduction of the incoming digital signal M, shown in FIG. 3.

Another unique and significant phenomenon flowing from the present circuit is that it enables the system to full duplex over a single signal line synchronously or asynchronously. Synchrononous transmission, where the outgoing and incoming signals are synchronous, that is where they are of the same repetition rate and are in phase, is shown above in connection with FIG. 3. Asynchronous operation entails the situation where the incoming digital signals need not have any repetition rate or phase relationship to the outgoing digital signals. In either synchronous or asynchronous operation, the present circuit is of a design that forms a composite wave of the incoming and outgoing digital signals and that subtracts a reference signal from the composite wave to form and derive the incoming digital signals and applies them to the receiver.

FIG. 4 illustrates [a] specific circuitry that implements the circuit shown in FIG. 2 functionally described above with reference to FIG. 3. As illustrated in FIG. 4, the switches S1 and S2 may be of any suitable conventional design, such as emitter coupled logic, as shown, or TTL logic. The outgoing signals from the transmitter T1 are applied to suitable voltage level shifting means such as a transistor Q1 connected to function as a shifter, as illustrated. The switches S1 and S2 may be of an emitter coupled logic, each comprising a pair of transistors Q2 and Q3, and Q4 and Q5 arranged in a conventional manner. To assure proper operation of the switches, suitable biasing means symbolically denoted by resistive elements, r2, r3, and r4 and may be operatively connected as illustrated. Also, the base electrodes of Q3 and Q5 are established at a suitable potential level utilizing another active element, transistor Q6 which is connected to derive the biasing potential from a potential dividing means comprised of impedance elements, r5, r7, r8 and r9. The DC potential source for the driver circuit, $V_{CC}$ and $V_{EE}$ is divided by the resistive elements r7, r8 and r9 and Q6 applies the potential so established to the base electrodes of Q3 and Q5.

The driver circuit includes a constant current source 13 containing a suitable active element, such as Q7, which derives and applies a predetermined level of current to switch S1 using resistance of a predetermined magnitude for the resistive element r6. Switch S1 is shown as a conventional current switch wherein only one of the two elements, Q4 and Q5, conducts at any given moment. Normally, Q4 is nonconducting in the absence of an enabling potential applied to the base electrode thereof. The potential that drives the Q4 comes from transistor Q1. Q1, as the level shifter, follows the signal potential input. Accordingly, its emitter output follows its input at its base electrode. The shift in the emitter, in turn, follows the signal form applied to its input at its base electrode. Q2 and Q4 are biased so that they conduct in the presence of one state, for example, digit 1, but not the other of the outgoing digital signals.

For example, in the presence of digital signals 1s or high state input signals, Q2 and Q4 are conductive. Q2 and Q4 become nonconductive in the presence of the opposite digital signal or 0s. In short, Q2 and Q4 become conductive in the presence of 1s of digital signals and nonconductive in the presence of 0s of digital signals. Thus, 1s and 0s are used as a means to represent the two states of a digital signal and of course, circuit parameters may be changed whereby Q2 and Q4 becomes conductive in the presence of 0s and nonconductive in the presence of 1s.

With Q4 of switch S1 conducting, transistors Q4 and Q7 provide current drain path for the transmission line 11. Inasmuch as the constant current from the source 13 is drained through the transmission path 11, the voltage at the transmission line is established by the IR drop formed by the line current times the load impedances RL and RL'. Station B is provided with the same circuitry and accordingly the same thing takes place in station B.

This being the case, referring to the voltage level at the transmission line, it is evident that when neither the transmitter of station A nor the transmitter of station B sends digital signals, then no current is present in the transmission line 11. Accordingly, the voltage at the transmission line is zero volts. The potential at the transmission line 11 shifts between two levels when transmitter T1 of station A or transmitter T2 of station B, but not both, sends a digital signal. When both transmitters send, then the voltage level at the transmission line 11 shifts between three levels, as illustrated in FIG. 3; O.

Inputs to differential amplifier DA [is] *are* connected as follows. The [inlput] *input* x is connected to the transmission line 11 via a resistive means r10. Second input means y is coupled to the collector electrode of first transistor Q2 of switch S2. Resistor r10 is connected to the first input terminal so that the signal from first switch S1 arrives at the input terminal x at the same time as the signal from the second switch S2 arrives at the second input terminal y when the transmitter T1 sends out the signal. In this manner, any spurious output signals, that may otherwise be generated by the difference in the arrival time of the signals to input terminals x and y, are eliminated. Obviously, if the two switches match in speed and switch at the same time resistor r10 can be eliminated.

By supplying ground or 0 volts for $V_{cc}$ and $-5.2$ volts for $V_{EE}$ and providing appropriate impedances for the various active and passive elements, it was possible to provide three levels of voltages to the transmission line, for example, 0 volts, $-0.8$ volts, and $-1.6$ volts, and apply to input x of differential amplifier DA and derive two levels of voltages, namely $-0.4$ volts and $-1.2$ volts, from the output of the first active element Q2 of second switch S2 and apply the same to second input terminal y of differential amplifier DA. Voltages at the transmission line 11 are, as indicated before, the result of the IR drop established by the IR drop across the impedance RL. RL was chosen to match the impedance of the transmission line itself to provide better energy transfer and minimum signal reflection.

The operation of the specific circuitry illustrated in FIG. 4 follows the operation of the functional circuitry shown in FIG. 2 and described in connection with FIG. 3 and hence, will be stated only briefly here. The output of Q2 of the switch S2 shifts the input terminal y of differential amplifier DA between two levels, namely $-0.4$ and $-1.2$ volts.

The signals in line 11 shift between two levels, namely, 0 and 0.8 volts, when either outgoing or incoming digital signals, but not both, are present. The line signal shifts between three levels, namely, 0, $-0.8$ and $-1.6$ volts when both outgoing and incoming digital signals of 0s and 1s are present.

The differential amplifier compares the two inputs x and y shifting between different levels as indicated by the signal conditions in line 11 and Q2 output and produces an output signal which is a reproduction of the incoming digital signal. The outputs so produced are then applied to the receiver R1.

In summary then, it has been shown that utilizing a novel circuitry of the type illustrated in FIG. 2, in a general block diagram form, and in a specific illustrative embodiment in FIG. 4, a digital signal transmission system can be rendered operative in a full duplex mode, over single signal path 11, synchronously or asynchronously.

FIG. 5 illustrates a transmission system wherein a plurality of transmitting stations may be operatively coupled to a single signal line 51 terminated by impedance means RL and RL' connected at the two ends thereof. Each station may include a transmitter and a receiver and may be provided with the aforedescribed drive circuitry having corresponding switches $S1_A$, $S1_B$ . . . $S1_N$, differential amplifiers $DA_A$, $DA_B$ . . . $DA_N$, etc. According to a further aspect of the present invention, the unique property of the circuit means, such as illustrated in FIGS. 2 and 4, permits a system such as that shown in FIG. 5 to operate in a broadcast mode. FIG. 5 illustrates this in that suppose a station, such as station A, sends out a digital signal, then all of the other stations, B . . . N, connected to the transmission line 51 can receive the signal sent by station A. This is so because the differential amplifiers of the other stations, B . . . N, detect the presence of the signal in the transmission line 51 coming from the transmitter A and apply it to the corresponding receivers. It can be readily seen then that by merely either eliminating the transmitters for the stations B . . . N or utilizing some suitable external control means, the stations B . . . N may be permitted to receive the signals coming from the Station A but are prevented from sending out any signals themselves.

It is also evident from FIG. 5 and from the foregoing description that any selected pair of stations A . . . N may provide simultaneous two-way communication over the same signal line 51. Suitable external control means in the form of a coding scheme or other circuitry (not shown) may be used to indicate the identity of called and calling stations so that they, not the others connected to line 51, communicate with each other.

In summary it has been shown that in accordance with the present invention, a novel drive circuitry is provided to permit a transmission system to operate in a full duplex mode, synchronously or asynchronously over a single signal path. It has also been shown that such a novel circuitry comprises two significant features; namely, it is designed to provide a current mode signal to the transmission line that allows two oppositely going signals to exist simultaneously on the same transmission line without interference and that it is designed to utilize the outgoing signal from the transmitter to derive a reference or indication signal and utilize the resulting reference signal to enable the associated receiver to ignore the outgoing digital signals present in the transmission line while receiving the incoming digital signals in the transmission line sent from the transmitter of another station. It has also been shown that because of its unique characteristics, use of the present circuitry makes it possible to operate a full duplex transmission system in a [boardcast] *broadcast* mode and with appropriate modifications, any pair of communication stations connected to the same single bus line of such a system may communicate with each other and be able to indicate their identity.

Various other modifications and changes may be made to the present invention from the principles of the invention described above without departing from the spirit and scope thereof, as encompassed in the accompanying claims.

What is claimed is:

1. A digital transmission system comprising:

at least a pair of stations, at least one of said stations having transmitting means and receiving means;

a single bus transmission signal path for carrying [the] incoming and outgoing digital signals and operatively connectable to said transmitting and said receiving means[;], *the outgoing digital signals corresponding to a first and a second logic state;* first means for applying the outgoing digital signals from said transmitting means to said path, said first means including current source means for supplying a constant current and [said] first switch means operating to supply or cut off said *constant* current from said path in accordance with the shifting pattern of the outgoing digital signals between its two states;

second means for combining the outgoing digital signals and incoming digital signals in said path to form a composite signal which shifts between a plurality of predetermined amplitude levels;

*impedance means connected to said path for providing IR voltage drops using current from the digital signals present in said path, said impedance means providing potential level shifts between first and second level potentials in the presence of either outgoing or incoming digital signals and potential level shifts among said first and second level potentials and a third level potential in the presence of both the outgoing and the incoming digital signals; and* third means for recovering the incoming digital signals from the composite signal and applying the recovered incoming digital signals to said [receiver] *receiving means*, including second switch means, means for operating said second switch means in response to the outgoing digital signals from [the transmitter] *said transmitting means* for generating digital indication signals which are the same in signal content as that of the outgoing digital signals and which shift between fourth and fifth level potentials, and comparing means having first and second input means, *the* first input means *being* for receiving the composite signal found in said [line] *path* and *the* second input means *being* for receiving said digital [indicating] *indication* signals [and], *said comparing means being for comparing the composite signal to said digital indication signals and* deriving an output from the comparison in the form of incoming digital signals from said path[; and]

[impedance means connected to said path for providing IR voltage drops using the current from the digital signals present in said path, said impedance means providing potential level shifts between first and second potentials in the presence of either outgoing or incoming digital signals and potential level shifts among said first and second level potentials and a third level potential in the presence of both the outgoing and the incoming digital signals].

2. The system according to claim 1, including means for maintaining [the amplitude of] said fourth and fifth level potentials intermediate between said first and second, and second and third level potentials, respectively, for minimizing susceptibility of said system to noise signals.

3. The system according to claim 2, including means for [generating a] *maintaining said constant* current of proper magnitude such that said first, second and third [voltage levels] *level potentials* can be derived across said impedance means to assure that said first and second switch means operate consistent with said [comparison] *comparing* means [input requirements].

4. The system according to claim 3, said system including a plurality of stations, each station having transmitting and receiving means; and means for enabling said system to operate in a broadcast mode.

5. The system according to claim 4, including means for enabling [the calling and called stations to identify themselves] *transmitting means for two of said plurality of stations for allowing said two stations to receive digital signals from each other.*

6. A driver circuit comprising:

a signal path;

first means for applying an outgoing digital signal from a signal source *to said signal path*, said first means including current switch means for converting said outgoing digital signal [in] *to* the form of [current] digital [signals and impedance means for providing composite IR voltage drops in said path using incoming and outgoing digital signal currents] *signal currents;* second means for combining said outgoing digital signal and an incoming digital signal in said path to form a composite signal which shifts between a plurality of predetermined amplitude levels, *said second means including impedance means for provid-*

*ing composite IR voltage drops in said path using incoming and outgoing digital signal currents;* third means for recovering said incoming digital signal from said composite signal, said third means including second switch means for deriving reference voltage signals which shift in amplitude in response to the outgoing digital [signals] *signal* and means for comparing said reference voltage signals with said composite IR voltage drops for deriving the incoming digital [signals] *signal* from the composite signal; and parameters of said current switch means, impedance means, and said second switch means are selected to shift the [voltages] *composite IR voltage drops* in said path between first and second levels in the presence of *the* outgoing or incoming digital [signals] *signal* alone, and between said first and said second level and a third level in the presence of both signals, and are selected to shift said reference [signal] *voltage signals* between fourth and fifth levels.

7. The circuit according to claim 6, wherein said third means includes means for establishing [the amplitude of] the fourth level [voltage] intermediate between the first and second [voltage level amplitudes] *levels* and the [amplitude of the] fifth level [voltage] intermediate between the second and third [level voltage amplitudes] *levels.*

8. A method of operating a digital transmission system in a full duplex mode over a single signal line, said system including at least a pair of stations, each station having transmitting sand receiving means, said method including the steps of:

applying outgoing digital signals from said transmitting means to said signal line[.]*;* combining the outgoing digital signals with incoming digital signals in said signal line to form a composite signal which shifts between a plurality of predetermined amplitude levels, said combining step including the [steps] *step* of shifting among [the three level potentials] *a first, a second, and a third level potential* in said line to form a composite voltage waveform representing the combination of the outgoing and incoming digital signals[,]*; and recovering the incoming digital signals from said composite signal, said recovering step including the steps of* deriving an indication signal from the outgoing digital signals and using said indication signal to prevent said receiving means for receiving said outgoing digital signals in said line, shifting the indication signal between fourth and fifth level [potential signals] *potentials* representing the outgoing digital signals, comparing the indication signal with the composite voltage waveform, and deriving the incoming digital signals from the comparison thereof[; and]

[recovering the incoming digital signals from said composite signal].

9. The method according to claim 8, including the step of establishing said fourth and fifth level [potential signals] *potentials* intermediate between said first and second, and second and third level potentials, respectively, to minimize the susceptibility of the method to noise interference.

10. The method according to claim 8, wherein said combining step comprises the steps of:

deriving current form digital signals for the outgoing and incoming *digital* signals;

applying said current form *digital* signals to impedance means connected to said line to form the composite signal which [vary] *varies* between *said* first and second [levels] *level potentials* when either outgoing or incoming digital signals are present, but not both, and [vary] *which varies* among said first and second [levels] *level potentials* and [a] *said* third level *potential* when both are present;

[deriving an indication signal voltage that shifts between] *and wherein said recovering step comprises the steps of: maintaining said* fourth and fifth [levels that corresponds to the 0s and 1s of the outgoing digital signals and that range] *level potentials* intermediate between said first and second, and said second and third [levels] *level potentials*, respectively;

[comparing said composite signals and said reference signal;]

[deriving an output in the form of the incoming digital signals from the comparison thereof;] and applying said [output of] *derived incoming digital signals to* said receiving means.

11. An apparatus for enabling a digital transmission system to operate in a full duplex mode over a single signal line, said system having at least two stations, each having a transmitter and a receiver, said apparatus comprising:

first means for applying an outgoing digital signal *having a first and a second logic state* from a transmitter of one of said stations to said line including first switch means actuatable in response to the presence of said outgoing digital signal and applying the outgoing digital signal to said line in the form of a current signal;

second means for combining said outgoing digital signal and an incoming digital signal in said line to form a composite signal which shifts between a plurality of predetermined amplitude levels;

third means for recovering said incoming digital signal from said composite signal and applying said recovered incoming digital signal to [said receiver] *a receiver of said one station*, said third means including [means responsive to the outgoing digital signals for generating an indication signal representative of the logic state of the outgoing digital signals, means interposed between said line and said receiver of said one station and responding to said indication signal for enabling said receiver to disregard said outgoing signal,] second switch means responsive to the outgoing digital signal for generating an indication signal representative of the logic state of the outgoing digital signal, and comparing means having first and second input means, said first input means *being* coupled to said line and said second input means *being* coupled to [the output of] said second switch means to receive said indication signal, said comparing means [including means] *being* for comparing input signals applied to said first and said second input means and preventing said [receiving means] *receiver of said one station* from receiving the outgoing digital signal;

a constant current source;

means coupling said constant current source to said first switch means for allowing current from said current source to flow to said signal line upon actuation of said first switch means;

*said second means including* impedance means of a predetermined magnitude connected to said signal line for establishing an IR voltage thereacross, said IR voltage drop shifting between first and second levels when either the outgoing or incoming digital [signals are] *signal is* present and shifting among said first and second levels and a third level when both are present;

said second [switching] *switch* means providing said indication signal in the form of a voltage that shifts between a fourth and a fifth level [voltage], said fourth level [having an amplitude range] *being* intermediate between said first and second levels, said fifth level [having an amplitude range] *being* intermediate between said second and third levels; and said comparing means comparing the [potential] levels [in the two inputs thereof] *of the applied input signals* and extracting from the comparison the incoming digital [signals] *signal* from said signal line.

12. An apparatus for enabling a digital transmission system to operate in a full duplex mode over a single signal line, said system having at least two stations, each having a transmitter and a receiver, said apparatus comprising;

first means for applying an outgoing digital signal *having a first and a second logic state* from a transmitter of one of said stations to said line including first switch means actuatable in response to the presence of said outgoing digital signal and applying the outgoing digital signal to said line in the form of a current signal;

second means for combining said outgoing digital signal and an incoming digital signal in said line to form a composite signal which shifts between a plurality of predetermined amplitude levels;

third means for recovering said incoming digital signal from said composite signal and applying said recovered incoming digital signal to [said receiver] *a receiver of said one station,* said third means including [means responsive to the outgoing digital signals for generating an indication signal representative of the logic state of the outgoing digital signals, means interposed between said line and said receiver of said one station, and responding to said indication signal for enabling said receiver to disregard said outgoing signal,] second switch means responsive to the outgoing digital signal for generating an indication signal representative of the logic state of the outgoing digital signal, and comparing means having first and second input means, said first input means *being* coupled to said line and said second input means *being* coupled to [the output of] said second switch means to receive said indication signal, said comparing means [including means or] *being for* comparing input signals applied to said first and said second input means and preventing said [receiving means] *receiver of said one station* from receiving the outgoing digital signal;

a constant current source;

means coupling said constant current source to said first switch means for allowing current from said current source to flow to said signal line upon actuation of said first switch means;

*said second means including* impedance means of a predetermined magnitude connected to said signal line for establishing an IR voltage drop thereacross, said IR voltage drop shifting between first and second levels when either the outgoing or incoming digital [signals are] *signal is* present and shifting among said first and second levels and a third level when both are present;

said second switch means providing said indication signal in the form a voltage signal that shifts its voltage between [the fourth and] *a fourth and a* fifth level representative of the logic state of the outgoing digital signal; and said comparing means generating a [high level] *first* output *level* when [the potential at] *a level applied to* said first input means exceeds that [at] *applied to* said second input means and generating a [low level] *second* output *level* when [the potential at] *a level applied to* said second input means exceeds that [at] *applied to* said first input means.

* * * * *